US011968618B2

(12) United States Patent
Yang et al.

(10) Patent No.: US 11,968,618 B2
(45) Date of Patent: Apr. 23, 2024

(54) EPC ENHANCEMENT FOR LONG DRX AND POWER SAVING STATE

(71) Applicant: Telefonaktiebolaget LM Ericsson (publ), Stockholm (SE)

(72) Inventors: Yong Yang, Kållered (SE); Qian Chen, Mölndal (SE); Peter Hedman, Helsingborg (SE); Tony Olsson, Nösund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 272 days.

(21) Appl. No.: 14/915,340

(22) PCT Filed: Sep. 27, 2013

(86) PCT No.: PCT/EP2013/070266
§ 371 (c)(1),
(2) Date: Feb. 29, 2016

(87) PCT Pub. No.: WO2015/043664
PCT Pub. Date: Apr. 2, 2015

(65) Prior Publication Data
US 2016/0219511 A1    Jul. 28, 2016

(51) Int. Cl.
*H04W 52/02* (2009.01)
*H04W 60/04* (2009.01)
(Continued)

(52) U.S. Cl.
CPC ... *H04W 52/0216* (2013.01); *H04W 52/0229* (2013.01); *H04W 60/04* (2013.01);
(Continued)

(58) Field of Classification Search
CPC ......... H04W 52/0216; H04W 52/0229; H04W 60/04; H04W 76/027; H04W 76/048; H04W 92/24; Y02B 60/50
See application file for complete search history.

(56) References Cited

U.S. PATENT DOCUMENTS 6,058,303 A * 5/2000 .ANG.strom ......... H04M 3/432
379/221.09
6,370,390 B1 * 4/2002 Salin ....................... H04W 4/12
455/422.1
(Continued)

FOREIGN PATENT DOCUMENTS

RU    2336653 C2    10/2008
RU    2012102059 A    7/2013
WO    2012174943 A1    12/2012

OTHER PUBLICATIONS

Author Unknown, "Technical Specification Group Services and System Aspects; Network architecture (Release 10)," Technical Specification 23.002, Version 10.2.0, 3GPP Organizational Partners, Mar. 2011, 93 pages.
(Continued)

*Primary Examiner* — Khaled M Kassim
(74) *Attorney, Agent, or Firm* — Withrow & Terranova, PLLC

(57) ABSTRACT

The invention relates to methods and device for detecting when a mobile terminal is in a state where it is incapable of replying to a message. In a first aspect of the present invention, it is provided a method of detecting, at a mobility node in a communications network, a state where a mobile terminal is incapable of replying to a message. The method comprises receiving the message from a gateway node, and determining whether the mobile terminal is incapable of replying to the message. Further, the method comprises
(Continued)

sending a response to the gateway node indicating that the mobile terminal is not yet capable to reply to the message.

7 Claims, 8 Drawing Sheets

(51) Int. Cl.
  *H04W 76/18* (2018.01)
  *H04W 76/28* (2018.01)
  H04W 92/24 (2009.01)
(52) U.S. Cl.
  CPC ........... *H04W 76/18* (2018.02); *H04W 76/28* (2018.02); H04W 92/24 (2013.01); Y02D 30/70 (2020.08)

(56) References Cited

U.S. PATENT DOCUMENTS

| | | | | |
|---|---|---|---|---|
| 9,392,391 | B2 | 7/2016 | Luo | |
| 9,432,823 | B2* | 8/2016 | Wu | H04W 4/14 |
| 9,615,327 | B2* | 4/2017 | Xie | H04W 52/0209 |
| 9,794,834 | B2* | 10/2017 | Fu | H04W 36/0033 |
| 2002/0077133 | A1 | 6/2002 | Mizell et al. | |
| 2003/0050097 | A1 | 3/2003 | Amirijoo et al. | |
| 2004/0110489 | A1* | 6/2004 | Murri | H04W 4/16 |
| | | | | 455/412.1 |
| 2005/0165944 | A1* | 7/2005 | Xue | H04L 12/2856 |
| | | | | 709/232 |
| 2006/0274672 | A1* | 12/2006 | Venkitaraman | H04L 43/0811 |
| | | | | 370/254 |
| 2010/0085904 | A1* | 4/2010 | Hamaue | H04W 52/0241 |
| | | | | 370/311 |
| 2010/0293265 | A1* | 11/2010 | Lindholm | H04W 60/005 |
| | | | | 709/223 |
| 2010/0312846 | A1 | 12/2010 | Lu et al. | |
| 2010/0330920 | A1 | 12/2010 | Koskela et al. | |
| 2011/0170517 | A1* | 7/2011 | Bakker | H04W 36/0033 |
| | | | | 370/331 |
| 2011/0201343 | A1* | 8/2011 | Pinheiro | H04W 76/046 |
| | | | | 455/450 |
| 2011/0217973 | A1* | 9/2011 | Sagfors | H04L 69/32 |
| | | | | 455/423 |
| 2011/0269462 | A1* | 11/2011 | Sagfors | H04W 36/36 |
| | | | | 455/436 |
| 2012/0094680 | A1* | 4/2012 | Stackelius | H04W 72/1242 |
| | | | | 455/452.1 |
| 2012/0115454 | A1* | 5/2012 | Liao | H04W 60/02 |
| | | | | 455/418 |
| 2012/0208486 | A1* | 8/2012 | Liao | H04W 28/02 |
| | | | | 455/404.1 |
| 2012/0238236 | A1* | 9/2012 | Liao | H04W 76/007 |
| | | | | 455/404.2 |
| 2012/0264443 | A1* | 10/2012 | Ng | H04W 60/04 |
| | | | | 455/450 |
| 2013/0045735 | A1* | 2/2013 | Kim | H04W 36/0094 |
| | | | | 455/422.1 |
| 2013/0107863 | A1* | 5/2013 | Faccin | H04W 36/0022 |
| | | | | 370/331 |
| 2013/0223312 | A1* | 8/2013 | Ai | H04W 80/04 |
| | | | | 370/311 |
| 2014/0050084 | A1* | 2/2014 | Cheng | H04W 28/0215 |
| | | | | 370/230 |
| 2014/0155109 | A1* | 6/2014 | Vaidya | H04W 8/06 |
| | | | | 455/458 |
| 2014/0194150 | A1* | 7/2014 | Wang | H04W 4/70 |
| | | | | 455/458 |
| 2014/0302874 | A1* | 10/2014 | Zakrzewski | H04W 8/22 |
| | | | | 455/456.1 |
| 2014/0370923 | A1* | 12/2014 | Wu | H04W 4/14 |
| | | | | 455/466 |
| 2015/0009988 | A1* | 1/2015 | Lim | H04L 47/2458 |
| | | | | 370/389 |
| 2015/0117285 | A1* | 4/2015 | Xie | H04W 52/0216 |
| | | | | 370/311 |
| 2015/0208288 | A1* | 7/2015 | Fu | H04W 36/0055 |
| | | | | 370/331 |
| 2016/0262041 | A1* | 9/2016 | Ronneke | H04W 52/0216 |
| 2016/0286385 | A1* | 9/2016 | Ryu | H04W 68/02 |
| 2017/0188411 | A1* | 6/2017 | Siomina | H04W 76/046 |
| 2017/0230817 | A1* | 8/2017 | Ryu | H04W 8/005 |
| 2017/0273053 | A1* | 9/2017 | Ryu | H04W 68/02 |
| 2017/0280314 | A1* | 9/2017 | Yang | H04W 8/12 |
| 2017/0295557 | A1* | 10/2017 | Chamarty | H04L 67/16 |

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 12)," Technical Specification 23.401, Version 12.2.0, 3GPP Organizational Partners, Sep. 2013, 293 pages.
International Preliminary Report on Patentability for International Patent Application No. PCT/EP2013/070266, dated Apr. 7, 2016, 7 pages.
Translation of Official Action and Search Report for Russian Patent Application No. 2016116278/07, dated Jul. 12, 2017, 6 pages.
Author Unknown, "Technical Specification Group Services and System Aspects; Machine-Type and other mobile data applications Communications enhancements (Release 12)," Technical Report 23.887, Version 1.2.0, 3GPP Organizational Partners, Aug. 2013, 153 pages.
Author Unknown, "Technical Specification Group Services and System Aspects; General Packet Radio Service (GPRS); Service description; Stage 2 (Release 12)," Technical Specification 23.060, Version 12.0.0, 3GPP Organizational Partners, Mar. 2013, 338 pages.
Author Unknown, "Technical Specification Group Services and System Aspects; General Packet Radio Service (GPRS) enhancements for Evolved Universal Terrestrial Radio Access Network (E-UTRAN) access (Release 12)," Technical Specification 23.401, Version 12.0.0, 3GPP Organizational Partners, Mar. 2013, 290 pages.
Author Unknown, "Technical Specification Group Core Network and Terminals; General Packet Radio Service (GPRS); GPRS Tunnelling Protocol (GTP) across the GN and GP interface (Release 12)," Technical Specification 29.060, Version 12.0.0, 3GPP Organizational Partners, Mar. 2013, 176 pages.
Author Unknown, "Technical Specification Group Core Network and Terminals; Mobility Management Entity (MME)—Visitor Location Register (VLR) SGs interface specification (Release 12)," Technical Specification 29.118, Version 12.1.0, 3GPP Organizational Partners, Jun. 2013, 67 pages.
Author Unknown, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," Technical Specification 29.274, Version 12.0.0, Mar. 2013, 228 pages.
Author Unknown, "Technical Specification Group Core Network and Terminals; Diameter based protocols to support Short Message Service (SMS) capable Mobile Management Entities (MMEs) (Release 12)," Technical Specification 29.338, Version 12.1.0, Jun. 2013, 42 pages.
International Search Report and Written Opinion for International Patent Application No. PCT/EP2013/070266, dated Jun. 2, 2014, 9 pages.
First Official Action and Search Report for Chinese Patent Application No. 201380079881.4, dated May 4, 2018, 21 pages.
Second Official Action for Chinese Patent Application No. 201380079881.4, dated Dec. 24, 2018, 25 pages.
Result of Consultation for U.S. Patent Application No. 13766997.4, dated Jul. 7, 2017, 3 pages.
Examination Report for European Patent Application No. 17192354.3, dated Jan. 15, 2019, 4 pages.

(56) References Cited

OTHER PUBLICATIONS

Office Action for Russian Patent Application No. 2018102241/07, dated Feb. 9, 2021, 14 pages.
Examination Report for European Patent Application No. 19191821.8, dated Apr. 21, 2023, 7 pages.

* cited by examiner

EPC ENHANCEMENT FOR LONG DRX AND POWER SAVING STATE

This application is a 35 U.S.C. § 371 national phase filing of International Application No. PCT/EP2013/070266, filed Sep. 27, 2013, the disclosure of which is incorporated herein by reference in its entirety.

TECHNICAL FIELD

The invention relates to methods and device for detecting when a mobile terminal is in a state where it is incapable of replying to a message.

BACKGROUND

In 3GPP wireless technologies, for example Global System for Mobile communications (GSM), Universal Mobile Telecommunication System (UMTS), and Long Term Evolution (LTE), the Radio Resource Control (RRC) protocol handles the control plane signalling of Layer 3 between the User Equipment (UE) and the Radio Access Network (RAN), i.e. the network residing between the UE and core network. In UMTS, the RAN is referred to as UMTS Terrestrial Radio Access Network (UTRAN) and comprises the NodeBs and Radio Network Controllers (RNCs), whereas in LTE the RAN is referred to as Evolved UMTS Terrestrial Radio Access Network (E-UTRAN) and comprises the evolved NodeBs (eNodeBs).

The RRC protocols includes for example:
Functions for connection establishment and release,
Broadcast of system information,
Radio bearer establishment/reconfiguration and release,
RRC connection mobility procedures,
Paging notification and release,
Outer loop power control.

In order to transmit/receive data to/from a mobile terminal such as a UE, the UE needs to have an established RRC connection. When in RRC connected mode, the UE may operate in different communication states. In 3GPP, these communication states are referred to as RRC states. FIG. 1 exemplifies the different communication states and the transitions between the states in a UMTS network. Inactivity for a certain time in a connected state, which is determined by a timer, generally results in transition to a less resource consuming state, while activity results in transition to a higher state in which more resources are required by the UE and the RAN. In general, communication states which provide the UE with a higher data rate require more resources, and vice versa, as is illustrated in FIG. 1. The signals used to effect transitions from one state to another are generally referred to as radio bearer reconfiguration signals in UMTS, and radio bearer setup/release signals in LTE.

The configuration of RRC inactivity timers in UMTS (and in LTE) networks has great impact on resource consumption in the RAN and the UE. The RRC idle mode (i.e. no connection) results in the lowest power consumption of the UE. In UMTS, the states in the RRC connected mode are, in order of decreasing resource consumption, CELL_DCH (Dedicated Channel), CELL_FACH (Forward Access Channel), CELL_PCH (Cell Paging Channel) and URA_PCH (URA Paging Channel). The power consumption in the CELL_FACH is roughly 50% of that in CELL_DCH, and the PCH states use about 1-2% of the power of the CELL_DCH state.

In order to decrease power consumption in the UE and system resources in the RAN, while the UE is in connected mode, there are functions like Discontinuous Reception and Transmission (DRX). The RAN determines, generally at setup, periods when the UE is permitted to turn off its transmitter or receiver, or both, in defined intervals when there is no data transmission. For example in a UMTS network, by allowing the UE to stay inactive in CELL_DCH state for longer time periods, the UE can restart transmission after a period of inactivity with a much shorter delay than would be necessary when switching state from CELL_FACH or URA_PCH or re-establishment of a new connection. This will also facilitate reduction of the number of state transitions between CELL_FACH, CELL_DCH and Idle. Discontinuous Reception is also available in LTE networks where the period in the connected state normally is longer than in UMTS networks. In fact, in LTE, DRX can be used even in connected mode instead of transitioning to CELL_FACH or URA_PCH. In LTE there are two different modes of DRX, short and long DRX mode. Further, in LTE, the DRX cycles are provided for the mobile terminal; long and short DRX. The long DRX cycle is used during the inactivity periods of the mobile terminal, when the terminal only has to check control channels and no resources are assigned. When data activity is detected, a transition to the short DRX cycle is triggered, thus increasing the responsiveness and connectivity of the mobile terminal.

In normal RRC connected mode, core network applications can assume that a user plane data path is available, though it may have certain latency, but submitted downlink user plane data get delivered to the UE without any additional effort or functionality for the applications. However, with the long DRX cycles or when in a power saving state, a UE may appear as "not reachable" or "not yet reachable" for downlink user plane data. The UE needs to poll regularly via user or control plane for getting any terminating data or events delivered.

As can be deducted from the above, prior art solutions have been focused on saving UE power. However, the UE being not reachable for downlink user plane data, e.g. when being in long DRX cycles and UE power saving states, causes extensive signalling in the network, which is undesirable.

SUMMARY

An object of the present invention is to solve, or at least mitigate, these problems in the art and to provide improved methods and devices for detecting when a mobile terminal is in a state where it is incapable of replying to a message.

This object is attained in a first aspect of the present invention by a method of detecting, at a mobility node in a communications network, a state where a mobile terminal is incapable of replying to a message. The method comprises receiving the message from a gateway node, and determining whether the mobile terminal is incapable of replying to the message. Further, the method comprises sending a response to the gateway node indicating that the mobile terminal is not yet capable to reply to the message.

This object is attained in a second aspect of the present invention by a method of detecting, at a gateway node in a communications network, a state where a mobile terminal is incapable of replying to a message. The method comprises sending the message to a mobility node, and receiving a response from the mobility node indicating the mobile terminal is not yet capable to reply to the message.

This object is further attained by a mobility node according to the first aspect of the present invention, and a gateway node according to the second aspect of the present invention.

Thus, this object is further attained by a mobility node in a communications network comprising a processing unit and a memory. The memory contains instructions executable by the processing unit, whereby the mobility node is operative to receive a message from a gateway node, determine whether a mobile terminal is incapable of replying to the message, and send a response to the gateway node indicating that the mobile terminal is not yet capable of replying to the message.

Hence, this object is further attained by a gateway node in a communications network comprising a processing unit and a memory. The memory contains instructions executable by the processing unit, whereby the gateway node is operative to send a message to a mobility node, and receive a response from the mobility node indicating that a mobile terminal is not yet capable to reply to the message.

Advantageously, in a communications network, such as LTE, UMTS or even GSM (LTE will be used to exemplify the present invention in the following), a gateway node such as a Serving Gateway (SGW) or Packet Data Network Gateway (PGW) sends a message to a mobility node such as a Mobility Management Entity (MME). The MME communicates with the mobile terminals (referred to as UEs) via base stations in the E-UTRAN referred to as eNodeBs. If for instance a new bearer is to be established, the PGW sends a message to the SGW comprising a create bearer request. It should be noted that the SGW and the PGW could be combined in the same network node, and that the message comprising e.g. a create bearer request, could be preceded by a Policy and Charging Rules Function (PCRF) node sending an instruction stipulating a policy change to the PGW/SGW, which instruction results in the create bearer request.

Thereafter, the SGW sends the message to the MME, wherein the MME determines whether the UE would be incapable of replying to the message or not, for instance if the UE is in a DRX long cycle or in a power saving state. Generally, the MME has knowledge about the capability of a UE to reply to data being sent to it without actually paging the UE, even though the MME could page the UE to determine its capability if necessary. In case the UE is not yet capable of responding to data sent to it, the MME will respond to the SGW with an indication thereof. As a consequence, the LTE core network, referred to as Evolved Packet Core (EPC) will be able to handling signalling related to the UE more efficiently. If the gateway node(s) are made aware of the incapability of the UEs to reply to data sent to them, it is possible to reduce the degree of signalling; the gateway nodes will not necessarily send more messages towards a UE until the UE is capable of replying to the messages.

In an embodiment of the present invention, the response to the PGW/SGW from the MME is further configured to indicate an estimated time when the UE will be capable of replying to the message. This is advantageous since the signalling in the core network pertaining to e.g. establishment of a bearer with the UE need not be resumed until the estimated time has expired and the UE again is capable of replying e.g. to a create bearer request.

In one embodiment of the present invention, the estimated time is based on a DRX cycle period. Thus, the UE listens to a Paging Channel (PCH), i.e. a downlink transport channel transferring a paging message with a certain period, and when the paging message is received, the UE exits the DRX mode and is reachable by the MME. By taking into account the DRX cycle period, the MME knows when the UE exits the DRX/idle mode and is capable of replying to a message sent to it by the MME.

In another embodiment of the present invention, when a UE changes either serving MME, serving SGW or both, i.e. when the UE changes Tracking Area (TA), the UE initiates a Tracking Area Update (TAU) by submitting a TAU request message to the core network. A periodic TAU procedure is initiated by the UE to periodically notify the availability of the UE to the network. Advantageously, in this embodiment, the estimated time is based on a period of an upcoming TAU. By taking into account the TAU period, the MME knows when the UE exits the DRX/idle mode and is capable of replying to a message sent to it by the MME.

In an embodiment of the present invention, the message from the gateway node the mobility node comprises any one of the group consisting of: create bearer request, update bearer request, delete bearer request, update Packet Data Protocol (PDP) context request, downlink data notification, delete PDP context request, etc.

In a further embodiment of the present invention, the response from the mobility node to the gateway node comprises any one of the group consisting of: create bearer response, update bearer response, delete bearer response, update PDP context response, downlink data notification acknowledgement, delete PDP context response, etc.

In an embodiment of the first aspect of the present invention, when the serving MME of the UE is changed from the current MME to another serving MME, it is advantageous if the state of the UE is reported to said another serving MME in order to avoid excessive signalling in the noew serving network. Thus, in this embodiment, the response sent to the PGW is further stored at the current MME, and forwarded to the other serving MME when the UE changes to this other serving MME.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
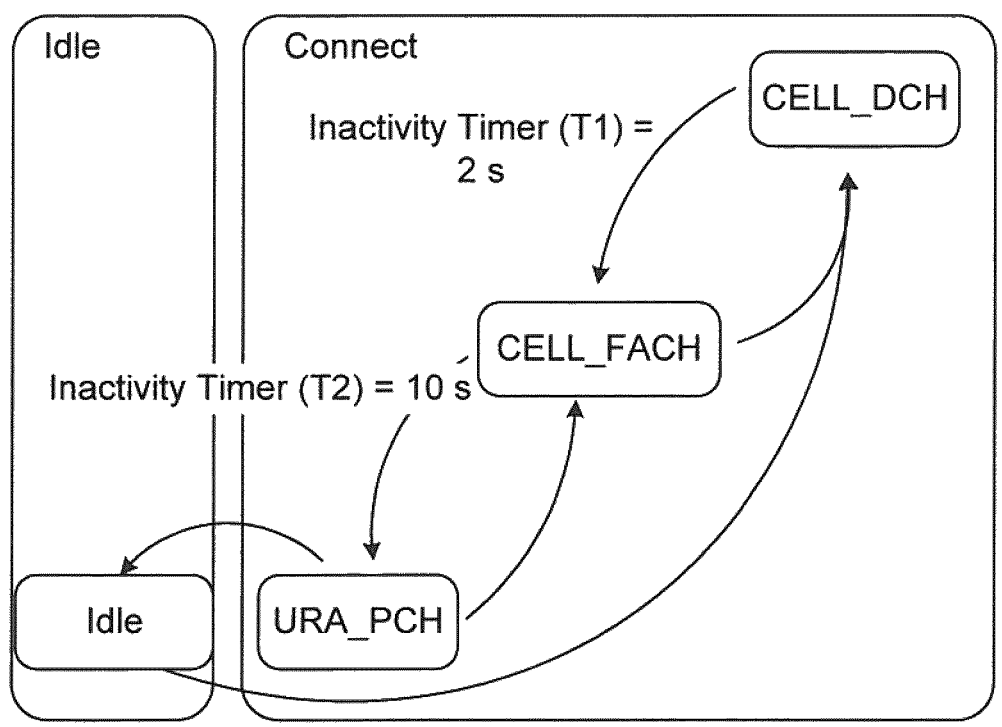
FIG. 1 exemplifies different communication states and transitions between the states in an LTE/UMTS network.

As previously has been discussed, FIG. 1 exemplifies the different communication states and the transitions between the states in an LTE/UMTS network, where a UE transits between three different states in connected mode; CELL_DCH, CELL_FACH and URA_PCH, and an Idle state in idle mode. Inactivity for a certain time, which is determined by a timer, in a connected state generally results in transition to a lower state, while activity results in transition to a higher state, and greater resources are assigned to the UE when it resides in the higher state. With reference to FIG. 1, this is illustrated by means of inactivity timer T1 which is set to 2 seconds, i.e. if there is no activity for 2 s when the mobile terminal is in state CELL_DCH, it will be moved to state CELL_FACH, and inactivity timer T2 which is set to 10 seconds, i.e. if there is no activity for 10 s when the mobile terminal is in state CELL_FACH, it will be moved to state URA_PCH. As is illustrated in FIG. 1, the higher the state, the more resources are assigned to the mobile terminal (and the device controlling the mobile terminal, e.g. an eNodeB in LTE or a combination of NodeB and RNC in UMTS). Consequently, the higher the state, the higher the resource consumption, e.g., UE battery power and radio resources, in the RAN. With further reference to FIG. 1, even though it is not shown in the figure, transitions to the previously mentioned DRX communication states are possible, causing the UE to be at least temporarily not reachable.

Figure 2:
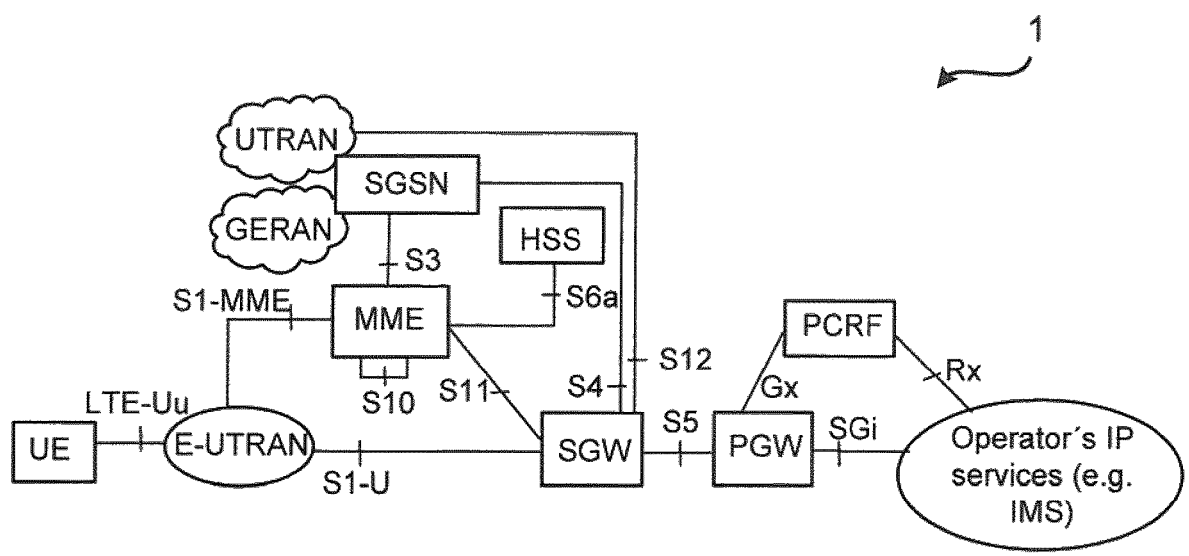
FIG. 2 shows a schematic overview of an exemplifying wireless communication system in which the present application can be implemented.

FIG. 2 shows a schematic overview of an exemplifying wireless communication system 1 in which the present application can be implemented. The wireless communication system 1 is an LTE based system. It should be pointed out that the terms "LTE" and "LTE based" system is here used to comprise both present and future LTE based systems, such as, for example, advanced LTE systems. It should be appreciated that although FIG. 2 shows a wireless communication system 1 in the form of an LTE based system, the example embodiments herein may also be utilized in connection with other wireless communication systems, such as e.g. GSM or UMTS as previously mentioned, comprising nodes and functions that correspond to the nodes and functions of the system in FIG. 2.

The wireless communication system 1 comprises a base station in the form of an eNodeB, operatively connected to an SGW, in turn operatively connected to an MME and a PGW, which in turn is operatively connected to a PCRF. The eNodeB is a radio access node that interfaces with a mobile radio terminal, i.e. a UE. The eNodeBs of the system forms the radio access network E-UTRAN for LTE communicating with the UEs over an air interface such as LTE-Uu. The SGW routes and forwards user data packets over S1-U, whilst also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the DL data path and triggers paging when DL data arrives for the UE, and further manages and stores UE contexts, e.g. parameters of the IP bearer service, network internal routing information. It also performs replication of the user traffic in case of lawful interception. The SGW communicates with the MME via interface S11 and with the PGW via S5. Further, the SGW may communicate with the UMTS radio access network UTRAN and with the GSM EDGE Radio Access Network (GERAN) via S12.

The MME is responsible for idle mode UE tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user by interacting with the Home Subscriber Server (HSS). The Non-Access Stratum (NAS) signaling terminates at the MME and it is also responsible for generation and allocation of temporary identities to UEs via S1-MME. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs. Further, there is an interface S10 configured for communication between MMEs for MME relocation and MME-to-MME information transfer.

The PGW provides connectivity to the UE to external packet data networks (PDNs) by being the point of exit and entry of traffic for the UE. A UE may have simultaneous connectivity with more than one PGW for accessing multiple PDNs. The PGW performs policy enforcement, packet filtering for each user, charging support, lawful Interception and packet screening. Another key role of the PGW is to act as the anchor for mobility between 3GPP and non-3GPP technologies such as WiMAX and 3GPP2 (CDMA 1X and EvDO). The interface between the PGW and the packet data network is referred to as the SGi. The packet data network may be an operator external public or private packet data network or an intra operator packet data network, e.g. for provision IP Multimedia Subsystem (IMS) services.

The PCRF determines policy rules in real-time with respect to the radio terminals of the system. This may e.g. include aggregating information in real-time to and from the core network and operational support systems, etc. of the system so as to support the creation of rules and/or automatically making policy decisions for user radio terminals currently active in the system based on such rules or similar. The PCRF provides the PGW with such rules and/or policies or similar to be used by the acting PGW as a Policy and Charging Enforcement Function (PCEF) via interface Gx. The PCRF further communicates with the packet data network via the Rx interface.

Figure 3:
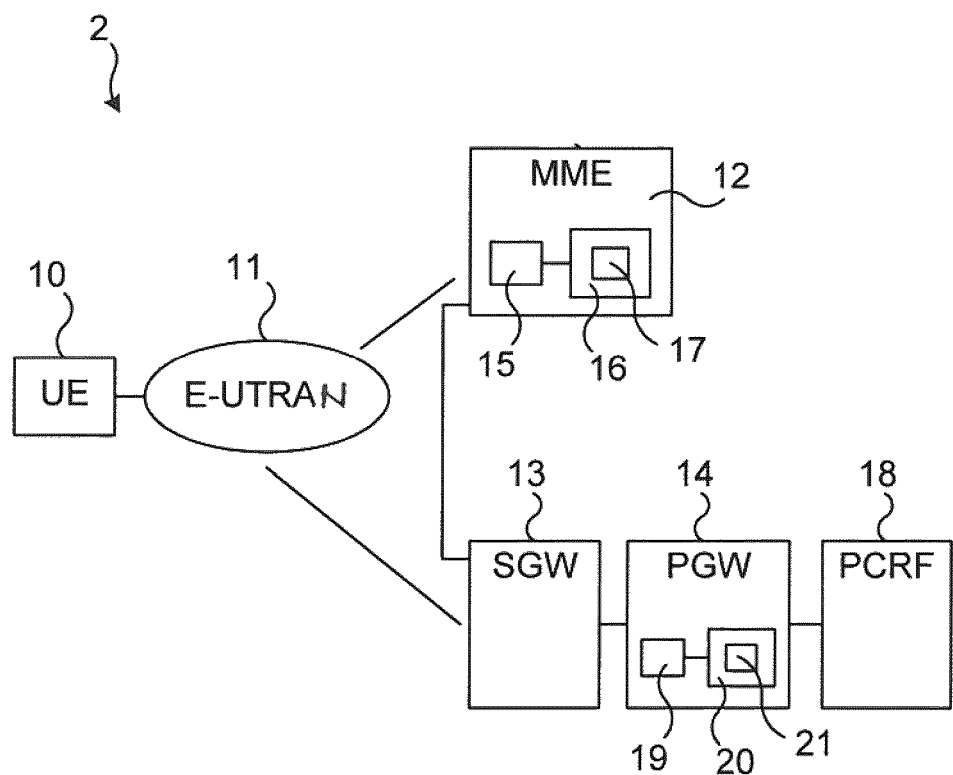
FIG. 3 shows a simplified version of the wireless communication system discussed in FIG. 2, where a mobility node according an embodiment of the first aspect of the present invention, and a gateway node according to an embodiment of the second aspect of the present invention, is illustrated.

FIG. 3 shows, for brevity, a simplified version of the LTE system discussed in detail in FIG. 2. FIG. 3 illustrates an LTE system 2 comprising a mobile terminal in the form of a UE 10 communicating via an E-UTRAN 11 with a device according to a first aspect of the present invention for detecting a state where the UE is incapable of replying to a message such as a paging request. In this exemplifying embodiment, the device according to the first aspect of the present invention is implemented in the form of an MME 12. In practice, the detection at the MME 12 is performed by a processing unit 15 embodied in the form of one or more microprocessors arranged to execute a computer program 17 downloaded to a suitable storage medium 16 associated with the microprocessor, such as a Random Access Memory (RAM), a Flash memory or a hard disk drive. The processing unit 15 is arranged to carry out the method according to embodiments of the first aspect of the present invention when the appropriate computer program 17 comprising computer-executable instructions is downloaded to the storage medium 16 and executed by the processing unit 15. The storage medium 16 may also be a computer program product comprising the computer program 17. Alternatively, the computer program 17 may be transferred to the storage medium 16 by means of a suitable computer program product, such as a floppy disk or a memory stick. As a further alternative, the computer program 17 may be downloaded to the storage medium 16 over a network. The processing unit 15 may alternatively be embodied in the form of a digital signal processor (DSP), an application specific integrated circuit (ASIC), a field-programmable gate array (FPGA), a complex programmable logic device (CPLD), etc.

As previously has been described in detail, the MME 12 communicates with an SGW 13, which in its turn communicates with the E-UTRAN 11 and the PGW 14. The PGW 14 is further communicatively coupled to a PCRF 18. In the following, a flowchart of a method according to the first aspect of the present invention for detecting, at the MME 12, a state where the UE 10 is incapable of replying to a message such as a paging request will be described.

Figure 4:
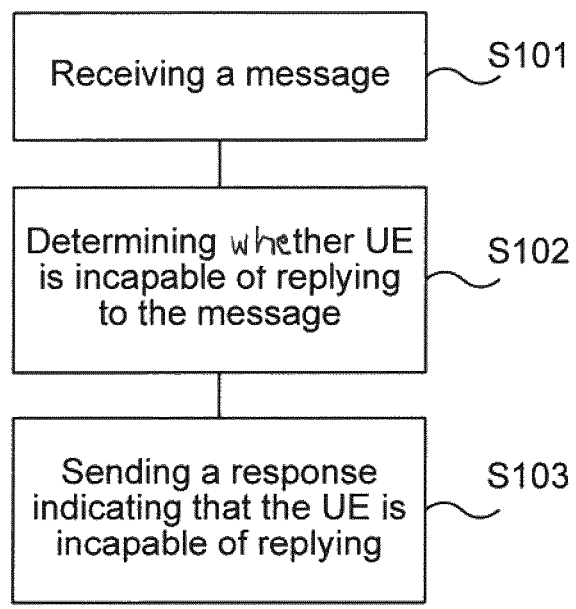
FIG. 4 shows a flowchart of a method according to an embodiment of the first aspect of the present invention.

Now, in order to advantageously avoid unnecessary and inefficient signalling in the LTE system 2 as previously has been discussed, an embodiment of a method according the first aspect of the present invention is proposed, a flowchart of which is shown in FIG. 4. Reference is further made to FIG. 3. In a first step, S101, the processing unit 15 of the MME 12 receives a message, e.g. a create bearer request, from the SGW 13. In a second step S102, the processing unit 15 of the MME 12 determines whether the UE 10 is incapable of replying to the message. This could e.g. be determined by sending a paging request to the UE 10, which request the UE 10 is yet not capable of responding to due to e.g. being in a long DRX cycle or being a power saving state. However, the MME 12 generally has information about the state of the UE 10 without sending a paging request. Information about the state of the UE 10 may e.g. be received by the MME 12 from the UE, e.g. in connection with a change of state of the UE. Finally, in step S103, the processing unit 15 of the MME 12 sends a response to the SGW 13 indicating that the UE 10 is not yet capable to reply to the message.

Again with reference to FIG. 3, and the simplified LTE system 2 illustrated therein. FIG. 3 illustrates an LTE system 2 comprising a mobile terminal in the form of a UE 10 communicating via an E-UTRAN 11 with an MME 12 and a device according to a second aspect of the present invention for detecting a state where the UE is incapable of replying to a message such as a paging request. In this exemplifying embodiment, the device according to the second aspect of the present invention is implemented in the form of an SGW 13, a PGW 14, or a single node comprising a combined SGW and PGW. In practice, the detection at the SGW/PGW is performed by a processing unit 19 embodied in the form of one or more microprocessors arranged to execute a computer program 21 downloaded to a suitable storage medium 20 associated with the microprocessor, as previously has been discussed with reference to the device 12 according to the first aspect of the present invention. In the following, a flowchart of a method according to the second aspect of the present invention for detecting, at the SGW 13 or the PGW 14 (in the following, the PGW 14 will be referred to as the device according to the second aspect of the present invention), a state where the UE 10 is incapable of replying to a message such as a paging request will be described.

Figure 5:
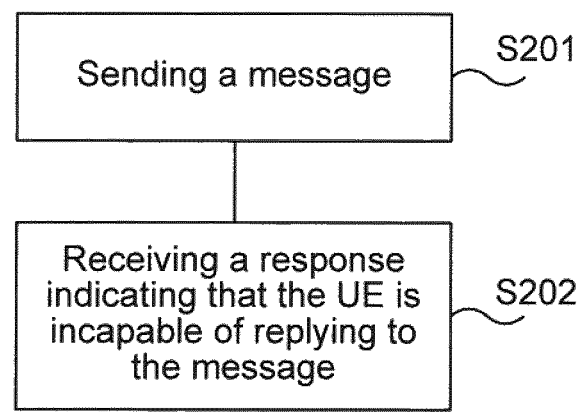
FIG. 5 shows a flowchart of a method according to an embodiment of the second aspect of the present invention.

Now, in order to advantageously avoid unnecessary and inefficient signalling in the LTE system 2 as previously has been discussed, an embodiment of a method according the second aspect of the present invention is proposed, a flowchart of which is shown in FIG. 5. Reference is further made to FIG. 3. In a first step, S201, the processing unit 19 of the PGW 14 sends a message, e.g. a create bearer request, to the MME 12 via the SGW 13. In a second step S202, the processing unit 19 of the PGW 14 receives from the MME 12, via the SGW 13, whether the UE 10 is incapable of replying to the message. This could e.g. be determined by the MME 12 sending a paging request to the UE 10, which request the UE 10 is yet not capable of responding to due to e.g. being in a long DRX cycle or being a power saving state. However, the MME 12 generally has information about the state of the UE 10 without sending a paging request.

In the following, various embodiments of the first and second aspects of the present invention will be discussed. Its should be noted that the mobility node could be embodied in the form of an SGSN, and the gateway node in the form of a Gateway General Packet Radio Service Support Node (GGSN).

In an embodiment of the present invention, the response to the PGW/SGW 13 from the MME 12 is further advantageously configured to indicate an estimated time when the UE 10 will be capable of replying to the message. This is advantageous since the signalling in the core network pertaining to e.g. establishment of a bearer with the UE need not be resumed until the estimated time has expired and the UE again is capable of replying e.g. to a create bearer request. Thus, the MME 12 is capable of estimating a time indicating when the mobile terminal will be capable of replying to the message.

In one embodiment of the present invention, the estimated time is based on a DRX cycle period. Thus, the UE 10 listens to a Paging Channel (PCH), i.e. a downlink transport channel transferring a paging message with a certain period, and when the paging message is received, the UE exits the DRX mode and is reachable by the MME 12. By taking into account the DRX cycle period, the MME 12 knows when the UE 10 exits the DRX/idle mode and is capable of replying to a message sent to it by the MME 12.

In another embodiment of the present invention, when a UE 10 changes either serving MME, serving SGW or both, i.e. when the UE 10 changes Tracking Area (TA), the UE 10 initiates a Tracking Area Update (TAU) by submitting a TAU request message to the core network. A periodic TAU procedure is initiated by the UE 10 to periodically notify the availability of the UE to the network. Advantageously, in this embodiment, the estimated time is based on a period of an upcoming TAU. By taking into account the TAU period, the MME 12 knows when the UE 10 exits the DRX mode and is capable of replying to a message sent to it by the MME 12.

In still another embodiment of the present invention, the message from the gateway node to the mobility node comprises any one of the group consisting of: create bearer request, update bearer request, delete bearer request, update PDP context request, downlink data notification, delete PDP context request, etc.

In still a further embodiment of the present invention, the response from the mobility node to the gateway node comprises any one of the group consisting of: create bearer response, update bearer response, delete bearer response, update PDP context response, downlink data notification acknowledgement, delete PDP context response, etc.

In an embodiment of the first aspect of the present invention, when the serving MME of the UE 10 is changed from the current MME 12 to another serving MME (not shown in the Figures), it is advantageous if the state of the UE 10 is reported to said another serving MME in order to avoid excessive signalling. Thus, in this embodiment, the response sent to the PGW 14 is further stored at the current MME 12, and forwarded to the other serving MME when the UE 10 changes to this other serving MME.

With reference again to FIG. 3, in an embodiment of the second aspect of the present invention, when the processing unit 19 of the PGW 14 receives a response indicating that the UE 10 is not yet capable of replying to a message such as a create bearer request, it may further transfer such information to the PCRF 18 to inform the PCRF that a requested policy change has not been enforced. The PGW 14 could further report to the PCRF 18 that a requested policy change in fact is successful when the UE 10 no longer is non-reachable. It should be noted that initially, what calls for a message being sent from the PGW 14 to the MME 12, is a policy change request sent from the PCRF 18 to the PGW 14. This will be discussed in more detail in the following.

Figure 6:
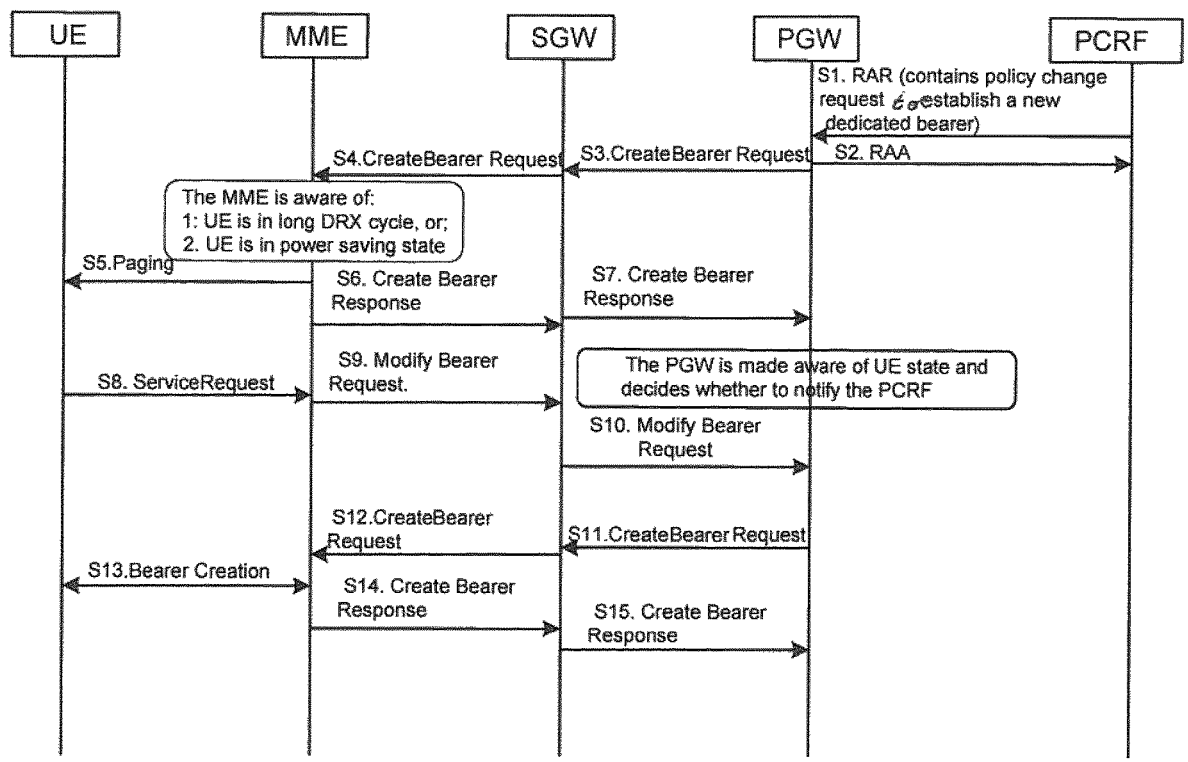
FIG. 6 shows a timing diagram illustrating bearer establishment according to an embodiment of the present invention.

FIG. 6 shows a timing diagram illustrating bearer establishment according to an embodiment of the present invention. In a first step S1, the PCRF initiates a so called Re-Authorize Request (RAR) containing a policy change request. In S2, the PGW confirms the received RAR with a Re-Authorize Answer (RAA). The PGW submits a create bearer request in S3 to the SGW in order to initiate the subsequent establishment of a bearer with the UE. Thereafter, in S4, the SGW submits the create bearer request to the MME. The MME may in step S5 page the UE. However, as previously has been discussed, the MME may already have knowledge about the capability of the UE to reply to data being sent to it without actually paging the UE. Thus, the MME determines whether the UE is non-reachable, e.g. for reasons of being in a long DRX cycle or in a power saving state.

In S6, the MME responds to the SGW with a create bearer response indicating that the UE is yet not capable of replying to a message sent to it, in this case a create bearer request. In practice, a flag could be set in the create bearer response indicating whether the UE is capable of replying or not. Possibly, a number of flags could be included in the message, e.g. distinguishing between the states "long DRX cycle" or "power saving state". Further, as previously has been discussed, the create bearer response may comprise an estimated time when the UE is capable of replying to a message sent to it.

In S7, the create bearer response is sent from the SGW to the PGW. At this point, the PGW is made aware of the state of the UE, and possibly at which estimated time the UE will be able to respond to a message. This information may be forwarded to the PCRF in which case a number of rounds of data transmission (not shown in FIG. 6) may be undertaken between the PGW and the PCRF, both at this point and subsequently. Thus, the SGW may optionally send the response it received from the MME the PCRF.

In S8, the UE exits the non-reachable state and sends a service request to the MME, which replies with sending a modify bearer request to the SGW in S9 indicating (for instance by means of setting a flag as previously discussed) that the UE now is reachable and thus capable of responding to a message for establishing a bearer. In S10, the modify bearer request is forwarded from the SGW to the PGW (and optionally further on to the PCRF). Hence, the PGW receives the modify bearer request from the MME in response to the service request submitted by the UE indicating that the UE is capable of replying to a further message. Consequently, the PGW sends a further message in the form of a create bearer request to the SGW in S11, which forwards the create bearer request to the MME in S12, wherein the MME establishes a bearer with the UE in S13. The MME subsequently sends a create bearer response in S14 to the SGW indicating that the bearer was successfully established. The SGW forwards the create bearer response to the PGW in S15, which optionally may inform the PCRF that the bearer successfully was established and that the requested policy change consequently has been enforced. Even though FIG. 6 shows the UE sending a service request to the PGW via the MME and the SGW, the PGW could alternatively have sent a create bearer request to the MME when an estimated time has passed indicating that the UE is capable of replying to the further create bearer request, should such an estimated time have expired before the UE sent its service request.

Figure 7:
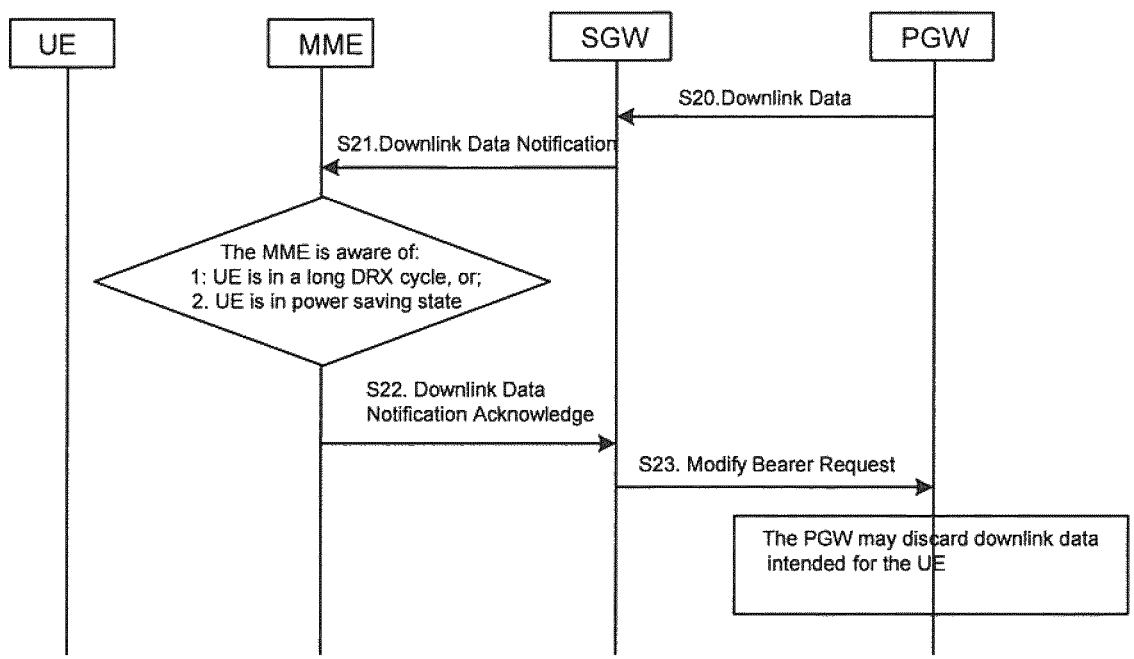
FIG. 7 shows a timing diagram illustrating transmission of downlink data according to an embodiment of the present invention.

FIG. 7 shows a timing diagram illustrating transmission of downlink data according to an embodiment of the present invention. In a first step S20, the PGW sends downlink intended for the UE to the SGW. In S21, the SGW sends a downlink data notification to the MME indicating that a transmission of downlink data is desired. The MME has knowledge about the capability of the UE to reply to data being sent to it without actually paging the UE. Thus, the MME determines whether the UE is non-reachable, e.g. for reasons of being in a long DRX cycle or in a power saving state.

In S22, the MME responds to the SGW with a downlink data notification acknowledgement indicating that the UE is yet not capable of replying to data to be sent to it. In practice, a flag could be set in the downlink data notification acknowledgement indicating whether the UE is capable of replying or not. Possibly, a number of flags could be included in the acknowledgement, e.g. distinguishing between the states "long DRX cycle" or "power saving state". Further, as previously has been discussed, the downlink data notification acknowledgement may comprise an estimated time when the UE is capable of replying to data to be sent to it.

In S23, a response such as a create bearer response is sent from the SGW to the PGW indicating that the UE is not reachable. At this point, the PGW is made aware of the state of the UE, and possibly at which estimated time the UE will be able to respond to a message. At this point, the PGW may discard the downlink data intended for the UE (and omit charging the UE), or possibly send it when the UE is reachable. Once the estimated time has passed indicating that the UE is capable of replying to a message sent to it, a create bearer request could be submitted from the PGW.

Figure 8:
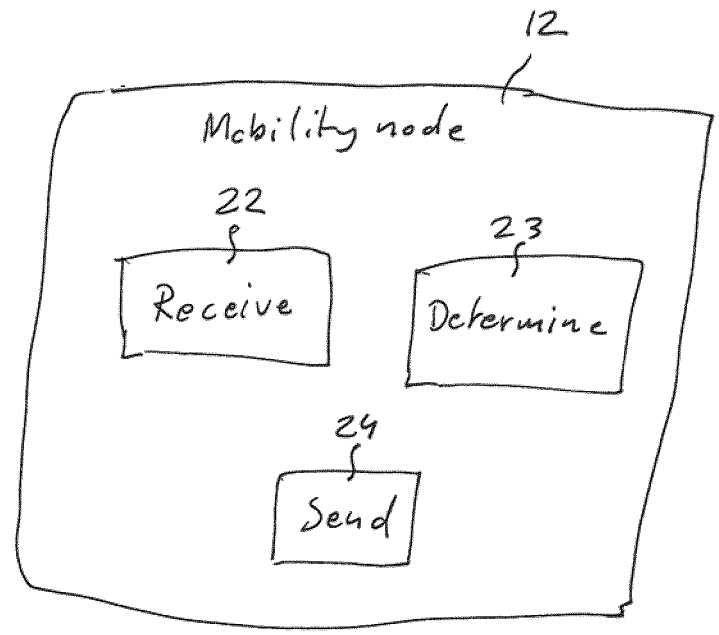
FIG. 8 illustrates a mobility node according an embodiment of the first aspect of the present invention.

FIG. 8 shows a mobility node 12 according to an embodiment of the first aspect of the present invention. The mobility node 12 comprises receiving means 22 adapted to receiving a message from a gateway node, determining means 23 adapted to whether a mobile terminal is incapable of replying to the message, and sending means 24 adapted to send a response to the gateway node indicating that the mobile terminal is not yet capable of replying to the message. The receiving means 22 may comprise a communications interface for receiving information from the mobile terminal, the gateway node and other devices. The sending means 23 may comprise a communications interface for sending information to the mobile terminal, the gateway node, and to other devices. The various interfaces have been described in detail with reference to FIG. 2. The mobility node 12 may further comprise a local storage. The receiving means 22, determining means 23 and sending means 24 may (in analogy with the description given in connection to FIG. 3) be implemented by a processor embodied in the form of one or more microprocessors arranged to execute a computer program downloaded to a suitable storage medium associated with the microprocessor, such as a RAM, a Flash memory or a hard disk drive. The receiving means 22, determining means 23 and sending means 24 may comprise one or more transmitters and/or receivers and/or transceivers, comprising analogue and digital components and a suitable number of antennae for radio communication.

Figure 9:
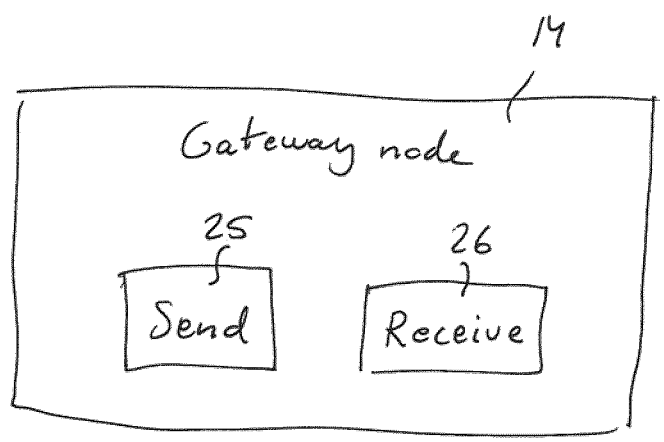
FIG. 9 illustrates a gateway node according to an embodiment of the second aspect of the present invention.

FIG. 9 shows a gateway node 14 according to an embodiment of the second aspect of the present invention. The gateway node 14 comprises sending means 25 adapted to sending a message to a mobility node, and receiving means 26 adapted to receiving a response from the mobility node indicating that a mobile terminal is not yet capable to reply to the message. The receiving means 26 may comprise a communications interface for receiving information from the mobility node and other devices. The sending means 25 may comprise a communications interface for sending information to the mobility node and to other devices. The various interfaces have been described in detail with reference to FIG. 2. The gateway node 14 may further comprise a local storage. The receiving means 26 and sending means 25 may (in analogy with the description given in connection to FIG. 3) be implemented by a processor embodied in the form of one or more microprocessors arranged to execute a computer program downloaded to a suitable storage medium associated with the microprocessor, such as a RAM, a Flash memory or a hard disk drive. The receiving means 26 and sending means 25 may comprise one or more transmitters and/or receivers and/or transceivers, comprising analogue and digital components and a suitable number of antennae for radio communication.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of detecting, at a mobility node in a communications network, a state where a mobile terminal is incapable of replying to a message, the method comprising:
   receiving a create bearer request from a gateway node for a subsequent establishment of a bearer with the mobile terminal;
   determining that the mobile terminal is non-reachable due to being in a long Discontinuous Reception and Transmission, DRX cycle or being in a power saving state;
   sending a Create Bearer response to the gateway node indicating that the mobile terminal is in the long DRX cycle or in the power saving state and not yet capable of replying to the message;
   receiving a service request from the mobile terminal as a control plane signal; sending, in response to the service request, a modify bearer request to the gateway node which modify bearer request comprises an indication indicating that the mobile terminal is now reachable and capable of responding to a message for establishing a bearer;
   storing the response at the mobility node; and
   forwarding the stored response to another serving mobility node when the mobile terminal changes to said another serving mobility node.

2. The method of claim 1, wherein the response to the gateway node further is configured to indicate an estimated time when the mobile terminal will be capable of replying to the message.

3. The method of claim 2, wherein the estimated time is based on a DRX cycle period or on a period of an upcoming Tracking Area Update, TAU.

4. A mobility node in a communications network comprising: a processing unit; and a memory, said memory containing instructions executable by said processing unit, whereby said mobility node is operative to:
   receive a create bearer request from a gateway node for a subsequent establishment of a bearer with the mobile terminal;
   determine that a mobile terminal is non-reachable due to being in a long Discontinuous Reception and Transmission, DRX cycle or being in a power saving state;
   send a Create Bearer response to the gateway node indicating that the mobile terminal is in the long DRX cycle or in the power saving state and not yet capable of replying to the message; receive a service request from the mobile terminal as a control plane signal;
   send, in response to the service request, a modify bearer request to the gateway node which modify bearer request comprises an indication indicating that the mobile terminal is now reachable and capable of responding to a message for establishing a bearer;
   store the response; and
   forward the stored response to another serving mobility node when the mobile terminal changes to said another serving mobility node.

5. The mobility node of claim 4, further being operative to: estimate an estimated time indicating when the mobile terminal will be capable of replying to the message; and indicate the estimated time in the response.

6. The mobility node of claim 5, wherein the estimated time is estimated based on a DRX cycle period or on a period of an upcoming TAU.

7. The mobility node of claim 4, said mobility node being a Mobility Management Entity, MME, or a Serving General Packet Radio Service Support Node, SGSN.

* * * * *

UNITED STATES PATENT AND TRADEMARK OFFICE
CERTIFICATE OF CORRECTION

PATENT NO. : 11,968,618 B2
APPLICATION NO. : 14/915340
DATED : April 23, 2024
INVENTOR(S) : Yang et al.

Page 1 of 1

It is certified that error appears in the above-identified patent and that said Letters Patent is hereby corrected as shown below:

In the Claims

In Column 12, Lines 51-52, in Claim 5, delete "estimate an. . . . . . . . message; and" and insert the same at Line 52, as a new sub-point.

Signed and Sealed this
Twenty-second Day of October, 2024

Katherine Kelly Vidal
*Director of the United States Patent and Trademark Office*